Figure 1:
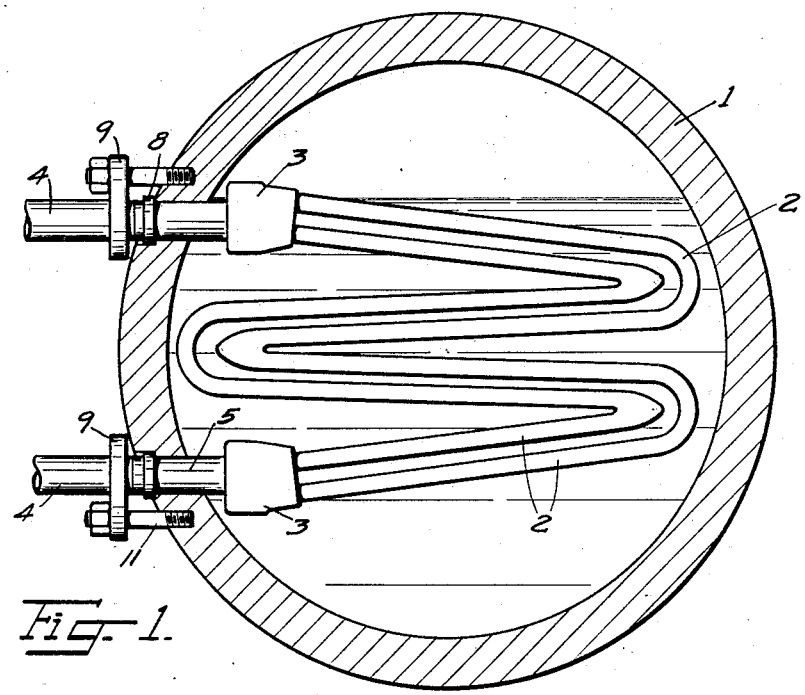

June 16, 1931.  O. H. HARTMANN  1,809,896

BOILER

Filed June 5, 1930

Otto H. Hartmann
INVENTOR

BY O. V. Thiele
ATTORNEY

Patented June 16, 1931

1,809,896

UNITED STATES PATENT OFFICE

OTTO H. HARTMANN, OF CASSEL-WILHELMSHOHE, GERMANY, ASSIGNOR TO THE SUPERHEATER COMPANY, OF NEW YORK, N. Y.

BOILER

Application filed June 5, 1930, Serial No. 459,308, and in Germany June 21, 1929.

The invention relates to indirectly heated boilers, the medium to be evaporated for use being heated in its drum or other receptacle not directly by the hot furnace gases, but indirectly by a second medium or heat carrier confined in a closed circuit one portion of which lies within the drum and delivers to the medium to be evaporated the heat which the other portion absorbs from the hot gases. The heat carrier is evaporated in absorbing heat and condensed as it gives up its heat.

The invention relates to means for connecting the portion of the closed circuit inside of the drum to the portion lying outside.

The object may be the generation of high pressure steam for prime movers or the superheating of such steam, or the evaporating or boiling of other liquids. One of the parts of the closed circuit containing the heat carrier usually consists in such heat exchangers of a tubular system receiving heat from the hot gases whereas the other portion, which lies in the interior of the drum, consists of heating elements in the form of U-shaped or serpentine pipes whose upper ends are connected to a manifold to supply the evaporated heat carrier, the lower ends being connected to a manifold which collects the condensate and from which it is removed. In the past, separable connections were used to place these parts into communication, these connections being such that the heating elements could be removed from the drum. The usual form was such that the manifolds were provided with nipples extending through holes drilled through the drum wall, a gasket being interposed and the nipple being connected with the tubular ends of the exterior heat carrier of the closed circuit. To make the connection tight, suitable nuts and studs were used or the pipes were equipped with flanges which were bolted together.

This known means of making such connections illustrated, for example in German Patent #441,749, has two drawbacks. In the first place, if it is desired to remove one of the heating elements from the interior of the drum, it must, after the connection with the drum is broken, be moved laterally a distance equal to the length of the connecting nipple of the manifold, with the result that the heating elements must be narrowed by this amount as compared with the dimension they might have as far as the drum itself is concerned. For this reason a considerable portion of the interior of the drum cannot be utilized for accommodating heat exchanging surface. In addition, leaks quite commonly develop in these prior means for making such connections at the points where the wall is pierced. This is in part due to the fact that these devices are used with pressures as high as 100 atmospheres and above, the walls of the drums being correspondingly heavy. Such leaks may be due at times to the fact that when the exterior heat absorbing portion of the closed circuit develops a leak, a considerable superheating of the heat carrier occurs and a relatively large expansion of the connecting pieces occurs as compared with the expansion of the wall of the drum. Further, the varying temperatures of the fluid to be heated may cause leaks when such fluid enters the drum at the lower points where these connections occur and where the condensate is taken off. Both these defects are obviated in accordance with the present invention by using intermediate pieces for making a permanent tight connection of the two parts of the closed circuit extending through the wall which are expanded from the outside both into the wall of the drum and into the wall of the manifolds of the heating elements in the drum. When the latter are to be removed, these intermediate pieces which are expanded at two places are cut between the wall of the drum and the wall of the manifold by means of a cutting tool inserted through the outer end of the intermediate piece, after which the part seated in the drum wall can be removed outwardly. The part of the thimble or intermediate piece remaining in the wall of the manifold can likewise easily be removed. When the heating elements are to be installed, new intermediate pieces are used. The principal advantage of this means of making the connection is found in the fact that a permanently tight joint is made even where there are considerable temperature variations, such as produced by conditions pointed out above. The temperature is rapidly equalized on account of the intimate contact between the intermediate piece and the wall of the drum so that no leaks occur from this cause. The further advantage is obtained that the heating elements can occupy the full width of the drum so that a considerable increase in amount of heating surface can be made. The expanding of the intermediate piece or thimble can be performed from the outside of the drum as can also the cutting when an element is to be removed so that it is not necessary to get into the drum either for making or breaking the joints.

Figure 2:
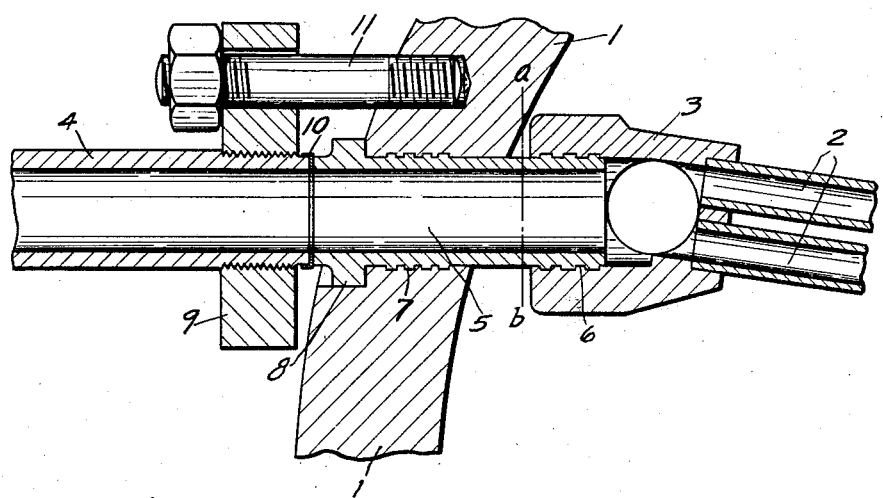

The drawings show an illustrative form of the invention, Fig. 1 showing a cross-section through a drum with an illustrative form of the heating elements and of the connections according to the invention, while Fig. 2 shows a section on an enlarged scale through the connection itself.

In the drawings, 1 is a drum which is filled with the fluid to be indirectly heated, the heating element being entirely submerged in the liquid. In the form shown, the heating elements consist of double U-shaped bifurcated elements 2 which are connected at their upper and lower ends to the manifolds 3. As may be seen in the drawings, the return bends opposite the manifolds lie close to the wall of the drum whereas when forms of connections are used as in the past, they would have to be shorter by an amount equal to the nipple of the manifolds 3 which extends through the walls. These manifolds 3, as well as the wall of the drum 1, are provided with annular grooves 6 and 7 (Fig. 2). To make the connection through the wall of the drum there are used the intermediate pieces or nipples 5, each nipple being advantageously provided with a flange 8. Such a nipple is inserted from the outside and is then rolled into the grooves mentioned above to form a secure and permanently tight connection with the wall of the drum and with the manifold. According to the form illustrated, the outer portion 4 of the closed circuit is connected to the exterior of the intermediate piece 5 by means of the studs 11 and the flange 9 screwed onto the end of the exterior piece, a soft steel gasket 10 or the equivalent being inserted on the outer end of the intermediate piece 8. If desired, the intermediate pieces 5 might be provided with a flange, and the outside connection between the flanges be made by means of bolts, a suitable gasket being inserted between them.

If one of the elements is to be removed, a pipe cutting implement is introduced from the outside into the intermediate piece or nipple and this piece is then cut in the plane $a-b$.

I claim:

1. In apparatus comprising a drum, a manifold inside of the drum, a pipe outside of the drum, the combination with said parts of a connecting piece extending through the wall and into the manifold and expanded into each to form a tight joint, and means to secure the pipe to the exterior end of the connecting piece.

2. In apparatus of the type described, the combination of a drum, two manifolds within the drum, tubular heat transfer elements with their ends connected to the manifolds, connecting pieces extending through the drum wall and expanded into it and into the manifolds, and pipes attached to the outer ends of said connecting pieces.

3. Apparatus in accordance with claim 2, the connecting pieces being provided with shoulders, and the drum being counterbored to provide abutments for the shoulders.

OTTO H. HARTMANN.